(12) United States Patent
Kang et al.

(10) Patent No.: US 11,912,911 B2
(45) Date of Patent: Feb. 27, 2024

(54) QUANTUM DOT, CURABLE COMPOSITION COMPRISING THE SAME, CURED LAYER USING THE COMPOSITION AND COLOR FILTER INCLUDING THE CURED LAYER

(71) Applicant: Samsung SDI Co., Ltd., Yongin-si (KR)

(72) Inventors: Yonghee Kang, Suwon-si (KR); Jonggi Kim, Suwon-si (KR); Jihyeon Yim, Suwon-si (KR); Dongjun Kim, Suwon-si (KR); Misun Kim, Suwon-si (KR); Minjee Park, Suwon-si (KR); Bumjin Lee, Suwon-si (KR); Injae Lee, Suwon-si (KR); Mi Jeong Choi, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 424 days.

(21) Appl. No.: 17/028,858

(22) Filed: Sep. 22, 2020

(65) Prior Publication Data

US 2021/0108135 A1    Apr. 15, 2021

(30) Foreign Application Priority Data

Oct. 14, 2019  (KR) .................. 10-2019-0127124

(51) Int. Cl.
| | |
|---|---|
| C09K 11/02 | (2006.01) |
| C09K 11/06 | (2006.01) |
| C09K 11/54 | (2006.01) |
| C01G 9/00 | (2006.01) |
| C08K 5/56 | (2006.01) |
| G02B 5/22 | (2006.01) |
| C08F 222/10 | (2006.01) |
| C08F 2/50 | (2006.01) |
| C08K 5/5397 | (2006.01) |
| C08K 3/22 | (2006.01) |
| B82Y 30/00 | (2011.01) |
| B82Y 20/00 | (2011.01) |

(52) U.S. Cl.
CPC .............. C09K 11/02 (2013.01); C01G 9/00 (2013.01); C08F 2/50 (2013.01); C08F 222/104 (2020.02); C08K 3/22 (2013.01); C08K 5/5397 (2013.01); C08K 5/56 (2013.01); C09K 11/54 (2013.01); G02B 5/223 (2013.01); B82Y 20/00 (2013.01); B82Y 30/00 (2013.01); C08K 2003/2241 (2013.01); C08K 2201/011 (2013.01)

(58) Field of Classification Search
CPC ....... C09K 11/02; C09K 11/025; C09K 11/06; C09K 11/54; C09K 2211/188; C08K 5/56; C08K 9/04; C08K 2201/011; C01G 9/00; C08F 2/50; C08F 222/104
See application file for complete search history.

(56) References Cited

U.S. PATENT DOCUMENTS

| | | | |
|---|---|---|---|
| 10,988,685 B2* | 4/2021 | Ahn | .................. H10K 85/1135 |
| 2009/0212258 A1 | 8/2009 | McCairn et al. | |
| 2012/0041142 A1 | 2/2012 | Nennemann et al. | |
| 2016/0289552 A1 | 10/2016 | Werner et al. | |
| 2018/0142149 A1* | 5/2018 | Youn | ................... G02B 6/0073 |
| 2018/0355244 A1 | 12/2018 | Lüchinger et al. | |
| 2019/0129302 A1 | 5/2019 | Youn et al. | |

FOREIGN PATENT DOCUMENTS

| | | |
|---|---|---|
| CN | 107722184 A | 2/2018 |
| CN | 108102640 A | 6/2018 |
| CN | 109749733 A | 5/2019 |
| CN | 110205111 A | 9/2019 |
| JP | 2018-84823 A | 5/2018 |
| JP | 2019-85568 A | 6/2019 |
| KR | 10-2010-0138925 A | 12/2010 |
| KR | 10-2018-0027617 A | 3/2018 |
| KR | 10-1839700 B1 | 3/2018 |
| KR | 10-2018-0059363 A | 6/2018 |
| KR | 10-2018-0059724 A | 6/2018 |
| KR | 10-2018-0092671 A | 8/2018 |
| KR | 10-2019-0004536 A | 1/2019 |
| KR | 10-2019-0047573 A | 5/2019 |
| KR | 10-2019-0095070 A | 8/2019 |

(Continued)

OTHER PUBLICATIONS

Japanese Office Action dated Sep. 14, 2021, for Application No. 2020-165520, 3 pages.

(Continued)

*Primary Examiner* — Matthew E. Hoban
*Assistant Examiner* — Lynne Edmondson
(74) *Attorney, Agent, or Firm* — Lewis Roca Rothgerber Christie LLP

(57) ABSTRACT

Quantum dots surface-modified with a compound represented by Chemical Formula 1 or Chemical Formula 2, a curable composition including the quantum dots, a cured layer, and a color filter.

$$M\text{---}(L^1\text{---}L)_n$$ Chemical Formula 1

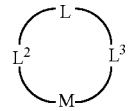

Chemical Formula 2

In Chemical Formula 1 and Chemical Formula 2, each substituent is the same as defined in the specification.

21 Claims, No Drawings

(56) References Cited

FOREIGN PATENT DOCUMENTS

| KR | 10-2019-0102857 A | 9/2019 |
|---|---|---|
| TW | 201923461 A | 6/2019 |
| TW | 201925420 A | 7/2019 |
| WO | 2019/030680 A1 | 2/2019 |
| WO | 2019/072882 A1 | 4/2019 |

OTHER PUBLICATIONS

Japanese Office Action dated Jan. 18, 2022 for Japanese Application No. 2020-165520, 3 pages.
Taiwanese Office Action, including a Search Report dated Mar. 28, 2022 of the corresponding Taiwanese Patent Application No. 109132996, 8 pages.
Taiwanese Office Action dated Jun. 9, 2021, and Search Report dated Jun. 2, 2021, for Application No. 109132996, 8 pages.
Chinese Search Report dated Jun. 14, 2023, for corresponding Application No. 2020110385025, 3 pages.

\* cited by examiner

QUANTUM DOT, CURABLE COMPOSITION COMPRISING THE SAME, CURED LAYER USING THE COMPOSITION AND COLOR FILTER INCLUDING THE CURED LAYER

CROSS-REFERENCE TO RELATED APPLICATION

This application claims priority to and the benefit of Korean Patent Application No. 10-2019-0127124, filed in the Korean Intellectual Property Office on Oct. 14, 2019, the entire content of which is incorporated herein by reference.

BACKGROUND

1. Field

This disclosure relates to a quantum dot, a curable composition including the same, a cured layer utilizing the composition, and a color filter including the cured layer.

2. Description of the Related Art

In the case of general (e.g., related art) quantum dots, due to hydrophobic surface characteristics, a solvent in which the quantum dots can be dispersed is limited. Thus, it is difficult to introduce (e.g., add) the quantum dots into a polar system, such as a binder and/or a curable monomer.

For example, even in the case of a quantum dot ink composition (which is being actively researched), a polarity thereof is relatively low in an initial step (act) and it may be dispersed in a solvent utilized in a curable composition having a high hydrophobicity. Because it is difficult to include 20 wt % or more quantum dots based on a total amount of the composition, it is therefore difficult (e.g., impossible) to increase photoefficiency (e.g., luminous efficiency, quantum efficiency, etc.) of the ink over a certain level. Even though quantum dots are additionally added and dispersed in order to increase photoefficiency, a viscosity exceeds the range (e.g., 12 cPs) capable of ink-jetting and thus processability may not be satisfied. That is, when the viscosity of the quantum dot ink composition exceeds the range (e.g., 12 cPs) suitable for ink-jet printing due to the addition of additional quantum dots, processability may be compromised.

In order to achieve the viscosity range capable of (e.g., suitable for) ink-jetting, a method of lowering an ink solid content by dissolving (e.g., adding) 50 wt % or more of a solvent based on a total amount of the composition has been utilized, which also provides a somewhat satisfactory result in terms of viscosity. However, it may be considered to be a satisfactory result in terms of viscosity, but nozzle drying due to solvent volatilization (e.g., evaporation), nozzle clogging, and reduction of a single layer (e.g., reduction in layer thickness or width) as time passed after jetting may become worse and it is difficult to control a thickness deviation after curing. Thus, it is difficult to apply this method to actual processes.

Therefore, a solvent-free quantum dot ink that does not include a solvent is the embodied (e.g., most desirable) form to be applied to an actual process. The current technique of applying a quantum dot itself to a solvent-based composition is now limited to a certain extent.

As reported so far, in the case of the embodied (e.g., most desirable) solvent-based composition to be applied to the actual process, the quantum dots, which are not surface-modified (such as through ligand-substitution), have a content of about 20 wt % to 25 wt % based on a total amount of a solvent-based composition. Therefore, it is difficult to increase photoefficiency and an absorption rate due to the viscosity limitation. Meanwhile, attempts have been made to lower the content of the quantum dots and increase the content of the light diffusing agent (scatterer) in other improvement approaches, but this has also failed to solve a precipitation problem and a low photoefficiency problem.

SUMMARY

An aspect according to embodiments of the present disclosure is directed toward providing a quantum dot that is surface-modified with a compound having an improved passivation effect and thus exhibits improved photoefficiency.

Another aspect according to embodiments of the present disclosure is directed toward providing a quantum dot-containing curable composition.

Another aspect according to embodiments of the present disclosure is directed toward providing a cured layer produced utilizing the curable composition.

Another aspect according to embodiments of the present disclosure is directed toward providing a color filter including the cured layer.

According to an embodiment, a quantum dot is surface-modified with a compound represented by Chemical Formula 1 or Chemical Formula 2.

Chemical Formula 1
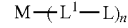

Chemical Formula 2
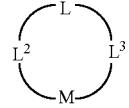

In Chemical Formula 1 and Chemical Formula 2,

M is a metal atom,

L is a monovalent or divalent functional group including a substituted or unsubstituted C1 to C20 oxyalkylene group, $L^1$ is an oxygen atom, a sulfur atom, *—C(=O)O—*, or *—OC(=O)—*, $L^2$ and $L^3$ are each independently *—C(=O)O—* or *—OC(=O)—*, and n is an integer of 2 to 4.

The monovalent functional group may include a substituted or unsubstituted C1 to C20 alkyl group and the divalent functional group may include a substituted or unsubstituted C3 to C20 cycloalkylene group.

The monovalent or divalent functional group, may have a substituted or unsubstituted C1 to C20 alkyl group, a substituted or unsubstituted C1 to C20 alkoxy group, a substituted or unsubstituted epoxy group, a substituted or unsubstituted C6 to C20 aryl group, or a substituted or unsubstituted vinyl group, at a terminal end thereof.

M may be Zn, Mg, Al, or In.

The compound represented by Chemical Formula 1 may be represented by Chemical Formula 1A.

Chemical Formula 1A $$M\text{---}[(L^1\text{---}L^4)_{m1}\text{---}(O\text{---}L^5)_{m2}\text{---}O\text{---}L^6\text{---}R^1]_n$$

In Chemical Formula 1A, $R^1$ is a substituted or unsubstituted C1 to C20 alkyl group, a substituted or unsubstituted epoxy group, a substituted or unsubstituted C6 to C20 aryl group, or a substituted or unsubstituted vinyl group, $L^1$ is an oxygen atom, a sulfur atom, *—C(=O)O—*, or *—OC(=O)—*, $L^4$ and $L^5$ are each independently a substituted or unsubstituted C1 to C20 alkylene group, $L^6$ is a single bond or a substituted or unsubstituted C1 to C20 alkylene group, m1 and m2 are each independently an integer of 1 to 20, and n is an integer of 2 to 4.

The compound represented by Chemical Formula 2 may be represented by Chemical Formula 2A.

Chemical Formula 2A $$M\begin{matrix}L^2\\ \diagdown\\ \diagup\\ L^3\end{matrix}L^7\begin{pmatrix}(L^1\text{---}L^4)_{m1}\text{---}(O\text{---}L^5)_{m2}\text{---}O\text{---}L^6\text{---}R^1\\ \\ (L^1\text{---}L^4)_{m1}\text{---}(O\text{---}L^5)_{m2}\text{---}O\text{---}L^6\text{---}R^1\end{pmatrix}$$

In Chemical Formula 2A, $R^1$ is a substituted or unsubstituted C1 to C20 alkyl group, a substituted or unsubstituted epoxy group, a substituted or unsubstituted C6 to C20 aryl group, or a substituted or unsubstituted vinyl group, $L^1$ is an oxygen atom, a sulfur atom, *—C(=O)O—*, or *—OC(=O)—*, $L^2$ and $L^3$ are each independently *—C(=O)O—* or *—OC(=O)—*, $L^4$ and $L^5$ are each independently a substituted or unsubstituted C1 to C20 alkylene group, $L^6$ is a single bond, or a substituted or unsubstituted C1 to C20 alkylene group, $L^7$ is a substituted or unsubstituted C3 to C20 cycloalkylene group, and m1 and m2 are each independently an integer of 1 to 20.

The compound represented by Chemical Formula 1 may be represented by one of Chemical Formula 1-1 to Chemical Formula 1-6.

Chemical Formula 1-1

$$Zn\text{---}[S\text{---}\text{---}(O\text{---}\text{---})_{m2}O\text{---}\text{---}\text{Ph}]_2$$

Chemical Formula 1-2

$$Zn\text{---}[S\text{---}\text{---}(O\text{---}\text{---})_{m2}O\text{---}\text{---}]_2$$

Chemical Formula 1-3

$$Zn\text{---}[O\text{---}C(=O)\text{---}\text{---}C(=O)O\text{---}\text{---}(O\text{---}\text{---})_{m2}O\text{---}\text{Ph}]_2$$

Chemical Formula 1-4

$$Zn\text{---}[O\text{---}C(=O)\text{---}\text{---}S\text{---}\text{---}(O\text{---}\text{---})_{m2}O\text{---}\text{Ph}]_2$$

Chemical Formula 1-5

$$Zn\text{---}[S\text{---}\text{---}(O\text{---}\text{---})_{m2}O\text{---}\text{---}CH=CH_2]_2$$

Chemical Formula 1-6

$$Zn\text{---}[S\text{---}\text{---}(O\text{---}\text{---})_{m2}O\text{---}\text{---}\text{epoxy}]_2$$

In Chemical Formula 1-1 to Chemical Formula 1-6, m2 is an integer of 1 to 20.

The compound represented by Chemical Formula 2 may be represented by Chemical Formula 2-1.

Chemical Formula 2-1

$$Zn\begin{matrix}O\\ \diagdown\\ \diagup\\ O\end{matrix}\begin{matrix}\square\end{matrix}\begin{pmatrix}C(=O)O\text{---}\text{---}(O\text{---}\text{---})_{m2}O\text{---}\text{---}CH=CH_2\\ \\ C(=O)O\text{---}\text{---}(O\text{---}\text{---})_{m2}O\text{---}\text{---}CH=CH_2\end{pmatrix}$$

In Chemical Formula 2-1, m2 is an integer of 1 to 20.

The quantum dots may have a maximum fluorescence emission wavelength at about 500 nm to about 680 nm.

According to another embodiment, a solvent-free curable composition includes the quantum dot and a polymerizable monomer having a carbon-carbon double bond at a terminal end thereof.

The polymerizable monomer in the solvent-free curable composition may have a molecular weight of about 220 g/mol to about 1,000 g/mol.

The polymerizable monomer in the solvent-free curable composition may be represented by Chemical Formula 3.

Chemical Formula 3

$$CH_2=C(R^2)\text{---}C(=O)\text{---}O\text{---}L^7\text{---}L^8\text{---}L^9\text{---}O\text{---}C(=O)\text{---}C(R^3)=CH_2$$

In Chemical Formula 3, $R^2$ and $R^3$ are each independently a hydrogen atom or a substituted or unsubstituted C1 to C10 alkyl group, $L^7$ and $L^9$ are each independently a substituted or unsubstituted C1 to C10 alkylene group, and $L^8$ is a substituted or unsubstituted C1 to C10 alkylene group or an ether group (*—O—*).

The solvent-free curable composition may include about 1 wt % to about 60 wt % of the quantum dot and about 40 wt % to about 99 wt % of the polymerizable monomer.

The solvent-free curable composition may further include a polymerization initiator, a light diffusing agent, or a combination thereof.

According to another embodiment, a solvent-based curable composition includes a quantum dot, a binder resin, and a solvent.

The solvent-based curable composition may include about 1 wt % to about 40 wt % of the quantum dot; about 1 wt % to about 30 wt % of the binder resin; and a balance being an amount of the solvent.

The solvent-based curable composition may further include a polymerizable monomer, a polymerization initiator, a light diffusing agent, or a combination thereof.

According to another embodiment, a cured layer is produced by a method including curing the curable composition.

According to another embodiment, a color filter includes the cured layer.

Other embodiments of the present disclosure are included in the following detailed description.

An embodiment provides a quantum dot surface-modified with a specific ligand (e.g., compound), the specific ligand has a very good passivation effect on the quantum dots, the quantum dot surface-modified with the ligand may be easily applied to both the solvent-based curable composition and the solvent-free curable composition compared with the existing (e.g., related art) quantum dots, and not only has suitable (e.g., excellent) processability, but also greatly improves photoefficiency of the cured layer produced utilizing the composition. Furthermore, the curable composition including the quantum dot according to an embodiment has suitable (e.g., excellent) storage stability and heat resistance.

DETAILED DESCRIPTION OF THE EMBODIMENTS

Hereinafter, embodiments of the present disclosure are described in more detail. However, these embodiments are exemplary, the present disclosure is not limited thereto and the subject matter of the present disclosure is defined by the scope of claims, and equivalents thereof.

As used herein, when specific definition is not otherwise provided, the term "alkyl group" refers to a C1 to C20 alkyl group, the term "alkenyl group" refers to a C2 to C20 alkenyl group, the term "cycloalkenyl group" refers to a C3 to C20 cycloalkenyl group, the term "heterocycloalkenyl group" refers to a C3 to C20 heterocycloalkenyl group, the term "aryl group" refers to a C6 to C20 aryl group, the term "arylalkyl group" refers to a C6 to C20 arylalkyl group, the term "alkylene group" refers to a C1 to C20 alkylene group, the term "arylene group" refers to a C6 to C20 arylene group, the term "alkylarylene group" refers to a C6 to C20 alkylarylene group, the term "heteroarylene group" refers to a C3 to C20 heteroarylene group, and the term "alkoxylene group" refers to a C1 to C20 alkoxylene group.

As used herein, when specific definition is not otherwise provided, the term "substituted" refers to replacement of at least one hydrogen atom by a substituent selected from a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, and a combination thereof.

As used herein, when specific definition is not otherwise provided, the term "hetero" refers to inclusion of at least one heteroatom selected from N, O, S, and P, in addition to carbon atoms, in the chemical formula.

As used herein, when specific definition is not otherwise provided, the term "(meth)acrylate" refers to both "acrylate" and "methacrylate", and the term "(meth)acrylic acid" refers to both "acrylic acid" and "methacrylic acid".

As used herein, when specific definition is not otherwise provided, the term "combination" refers to mixing or copolymerization.

In the present specification, when a definition is not otherwise provided, hydrogen is bonded at the position where a chemical bond is supposed to be given but not drawn in a chemical formula.

In the present specification, a cardo-based resin refers to a resin including at least one functional group selected from Chemical Formula 4-1 to Chemical Formula 4-11 in the backbone of the resin.

In addition, in the present specification, when a definition is not otherwise provided, "*" refers to a linking point with the same or different atom or chemical formula.

In general, because quantum dots are dispersed (e.g., are dispersable) in limited solvents due to hydrophobic surface characteristics, there are much (e.g., lots of) difficulties in introducing (e.g., adding) the quantum dots into a polar system such as a binder resin, a curable monomer, and/or the like.

For example, a quantum dot-containing curable composition, which is being actively researched, is prepared by dispersing the quantum dots in a curable composition having a relatively low polarity and high hydrophobicity at a low concentration in the initial step (act). Accordingly, because the quantum dots are hardly (e.g., not) included in a content of greater than or equal to about 20 wt % based on a total amount of the composition, photoefficiency of the curable composition may not be increased over a certain level. In order to increase the photoefficiency, the quantum dots may be additionally excessively added and dispersed, but the viscosity may exceed the range suitable for ink-jetting, which makes the processability unsatisfactory.

In addition, in order to realize the viscosity range that the ink-jetting is applicable, a method of including a solvent in an amount of greater than or equal to about 50 wt % based on the total amount of the curable composition and thus reducing a solid content therein may be utilized. This method may bring about suitable (e.g., excellent) viscosity but have drawbacks of not being suitably applied (e.g., of being hardly applied) in amount due to nozzle drying from solvent volatilization during the ink-jetting, nozzle clogging, single film reduction over time after the ink-jetting, and/or severe thickness deviation after the curing.

Accordingly, the quantum dot curable composition, considering that a solvent-free type composition including no solvent is a development approach applicable to the actual processes, has a limit to applying the current quantum dots. That is, a solvent-free quantum dot curable composition including no solvent is being developed for actual processes. However, the related art quantum dots have limitations for usage in such a composition.

Related art quantum dots, which are not surface-modified (such as through ligand substitution and/or the like), are included in a small amount of about 20 wt % to about 25 wt % based on the total amount of the curable composition, and accordingly, it is difficult to increase the photoefficiency and absorption rate due to the viscosity limitation. In addition, another development approach may be a method of decreasing a content of the quantum dots but increasing a content of a light diffusing agent such as $TiO_2$ and/or the like, which may also fail in improving precipitation problems and/or the low photoefficiency problems.

Also, a related art solvent-based curable composition including the quantum dots may cause nozzle-clogging due to solvent drying in the nozzle during the ink-jetting as described above, may not maintain a target pixel thickness due to ink evaporation in the ink-jetted pixel, and thus may not secure ink-jetting processability.

In addition, in order to form a layer having a set or predetermined thickness through post-baking (or additional thermal-curing) after forming a thin film in the pixel, a pinning point (a maximum height where a bubble does not collapse) should be formed by ink-jetting a large amount of ink far above the pixel height, which is effectively or practically impossible, and in addition, the processible solvent should have a surface tension close to 40 dyne/cm, which is rarely possible to develop.

Accordingly, an aspect of the present disclosure after a long study by the present inventive entity is to utilize a metal complex ligand having no thiol group to surface-modify the quantum dots, thereby reducing or preventing deterioration of optical characteristics of the quantum dots and concurrently or simultaneously, greatly improving storage stability and heat resistance of the quantum dot-containing curable composition.

For example and in some embodiments, the ligand may be represented by Chemical Formula 1 or Chemical Formula 2.

Chemical Formula 1

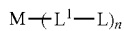

Chemical Formula 2

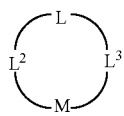

In Chemical Formula 1 and Chemical Formula 2,

M is a metal atom,

L is a monovalent or divalent functional group including a substituted or unsubstituted C1 to C20 oxyalkylene group, $L^1$ is an oxygen atom, a sulfur atom, *—C(=O)O—*, or *—OC(=O)—*, $L^2$ and $L^3$ are *—C(=O)O—* or *—OC(=O)—*, and n is an integer of 2 to 4.

The compound represented by Chemical Formula 1 or Chemical Formula 2 is a metal complex ligand having a completely different structure from a thiol-based compound that is often utilized as a related art surface modification material for quantum dots. When quantum dots are surface-modified with such a ligand according to embodiments of the present disclosure, the surface-modified quantum dots may greatly improve photoefficiency of a cured layer made of the quantum dot-containing composition, and further improve storage stability and heat resistance of the composition.

In Chemical Formula 1, L may be a monovalent functional group, and may include (e.g., may be) a substituted or unsubstituted C1 to C20 alkyl group.

In Chemical Formula 2, L may be a divalent functional group, and may include (e.g., may be) a substituted or unsubstituted C3 to C20 cycloalkylene group.

In Chemical Formula 1 and Chemical Formula 2, L that is the monovalent or divalent functional group, may have a substituted or unsubstituted C1 to C20 alkyl group, a substituted or unsubstituted C1 to C20 alkoxy group, a substituted or unsubstituted epoxy group, a substituted or unsubstituted C6 to C20 aryl group, or a substituted or unsubstituted vinyl group, at the terminal end thereof.

For example, M may be Zn or Mg, which is a divalent metal, or Al or In, which is a trivalent metal.

For example, Chemical Formula 1 may be represented by Chemical Formula 1A.

Chemical Formula 1A

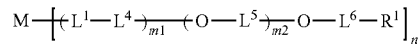

In Chemical Formula 1A, $R^1$ is a substituted or unsubstituted C1 to C20 alkyl group, a substituted or unsubstituted epoxy group, a substituted or unsubstituted C6 to C20 aryl group, or a substituted or unsubstituted vinyl group, $L^1$ is an oxygen atom, a sulfur atom, *—C(=O)O—*, or *—OC(=O)—*, $L^4$ and $L^5$ are each independently a substituted or unsubstituted C1 to C20 alkylene group, $L^6$ is a single bond or a substituted or unsubstituted C1 to C20 alkylene group, m1 and m2 are each independently an integer of 1 to 20, and n is an integer of 2 to 4.

For example, Chemical Formula 2 may be represented by Chemical Formula 2A.

Chemical Formula 2A

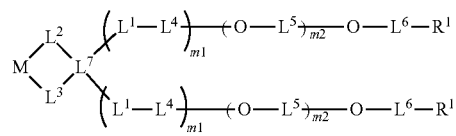

In Chemical Formula 2A, $R^1$ is a substituted or unsubstituted C1 to C20 alkyl group, a substituted or unsubstituted epoxy group, a substituted or unsubstituted C6 to C20 aryl group, or a substituted or unsubstituted vinyl group, $L^1$ is an oxygen atom, a sulfur atom, *—C(=O)O—*, or *—OC(=O)—*, $L^2$ and $L^3$ are each independently *—C(=O)O—* or *—OC(=O)—*, $L^4$ and $L^5$ are each independently a substituted or unsubstituted C1 to C20 alkylene group, $L^6$ is a single bond or a substituted or unsubstituted C1 to C20 alkylene group, $L^7$ is a substituted or unsubstituted C3 to C20 cycloalkylene group, and m1 and m2 are each independently an integer of 1 to 20.

The compound represented by Chemical Formula 1 or Chemical Formula 2 may have a weight average molecular weight of less than or equal to about 1000 g/mol, for example, about 200 to about 1000 g/mol. When the compound represented by Chemical Formula 1 or Chemical Formula 2 has a weight average molecular weight within the above ranges, a viscosity of the curable composition containing a quantum dot surface-modified with the compound may be kept low, which may be desirable (e.g., advantageous) for ink-jetting.

For example, Chemical Formula 1 may be represented by one of Chemical Formula 1-1 to Chemical Formula 1-6, but the present disclosure is not limited thereto.

Chemical Formula 1-1

Chemical Formula 1-2

Chemical Formula 1-3

Chemical Formula 1-4

Chemical Formula 1-5

Chemical Formula 1-6

In Chemical Formula 1-1 to Chemical Formula 1-6, m2 is an integer of 1 to 20.

For example, the compound represented by Chemical Formula 2 may be represented by Chemical Formula 2-1, but the present disclosure is not limited thereto.

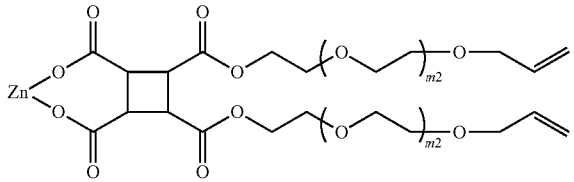

Chemical Formula 2-1

In Chemical Formula 2-1, m2 is an integer of 1 to 20.

For example, the quantum dots may have a maximum fluorescence emission wavelength at about 500 nm to about 680 nm.

The curable composition according to another embodiment includes quantum dots surface-modified with the compound represented by Chemical Formula 1 or Chemical Formula 2.

Until recently, the quantum dot-containing curable composition (ink) may have been developed toward specializing monomers having good compatibility with quantum dots, and furthermore, their commercialization has been made.

On the other hand, because a generally and widely utilized polymerizable monomer, an -ene-based monomer (including a vinyl-based monomer, an acrylate-based monomer, a methacrylate-based monomer, and/or the like which include a mono-functional monomer or a multi-functional monomer) has low compatibility with the quantum dots and is limited in terms of dispersibility of the quantum dots, various developments for usefully applying it to the quantum dot-containing curable composition are substantially difficult. Above all, the -ene-based monomer shows no high concentration quantum dot dispersibility and thus has difficulties in being applied to the quantum dot-containing curable composition.

Because of this drawback, the quantum dot-containing curable composition has been developed to have a composition of including a solvent in a considerable amount (greater than or equal to about 50 wt %), but when the solvent content is increased, ink-jetting processability may be deteriorated. Accordingly, in order to satisfy the ink-jetting processability, a demand of a solvent-free curable composition is desired.

The present disclosure provides a solvent-free curable composition, whose demand is increased, by utilizing a polymerizable monomer including a compound having a carbon-carbon double bond at the terminal end along with quantum dots surface-modified by the compound represented by Chemical Formula 1 or Chemical Formula 2 to improve affinity of the quantum dots for a curable composition and thus obtaining high-concentration dispersibility of the quantum dots even in a solvent-free system and also, accomplishing a passivation of not deteriorating inherent optical characteristics of the quantum dots (e.g., inhibiting the deterioration of the inherent optical characteristics of the quantum dots).

Hereinafter, each component constituting the solvent-free curable composition is described in more detail.

Quantum Dots

Quantum dots included in the solvent-free curable composition include quantum dots surface-modified with the compound represented by Chemical Formula 1 or Chemical Formula 2.

For example, the quantum dots absorb light in a wavelength region of about 360 nm to about 780 nm, for example about 400 nm to about 780 nm, and emits fluorescence in a wavelength region of about 500 nm to about 700 nm, for example about 500 nm to about 580 nm, or about 600 nm to about 680 nm. That is, the quantum dots may have a maximum fluorescence emission wavelength (fluorescence $\lambda_{em}$) at about 500 nm to about 680 nm.

The quantum dots may each independently have a full width at half maximum (FWHM) of about 20 nm to about 100 nm, for example, about 20 nm to about 50 nm. When the quantum dots have a full width at half maximum (FWHM) in these ranges, color reproducibility is increased when utilized as a color material in a color filter due to high color purity.

The quantum dots may each independently be an organic material, an inorganic material, or a hybrid (mixture) of an organic material and an inorganic material.

The quantum dots may each independently include (e.g., be composed of) a core and a shell surrounding the core, and the core and the shell may each independently have (e.g., further have) a structure of a core, core/shell, core/first shell/second shell, alloy, alloy/shell, and/or the like, which is composed of Group II-IV elements, Group III-V elements, and/or the like, but embodiments of the present disclosure are not limited thereto.

For example, the core may include at least one material selected from CdS, CdSe, CdTe, ZnS, ZnSe, ZnTe, HgS, HgSe, HgTe, GaN, GaP, GaAs, InP, InAs, and an alloy thereof, but the present disclosure is not necessarily limited thereto. The shell surrounding the core may include at least one material selected from CdSe, ZnSe, ZnS, ZnTe, CdTe, PbS, TiO, SrSe, HgSe, and an alloy thereof, but the present disclosure is not necessarily limited thereto.

In an embodiment, because an interest in the environment has recently been much increased over the whole world, and a restriction (e.g., regulation) of a toxic material has also been fortified (e.g., tightened), a cadmium-free light emitting material (InP/ZnS, InP/ZnSe/ZnS, etc.) having slightly lower (e.g., little low) quantum efficiency (quantum yield) but being environmentally-friendly (instead of a light emitting material having a cadmium-based core) is utilized, but the present disclosure is not necessarily limited thereto.

In the case of the quantum dots of the core/shell structure, an entire size including the shell (an average particle diameter) may be about 1 nm to about 15 nm, for example, about 5 nm to about 15 nm.

For example, the quantum dots may include red quantum dots, green quantum dots, or a combination thereof. The red quantum dots may each independently have an average particle diameter of about 10 nm to about 15 nm. The green quantum dots may each independently have an average particle diameter of about 5 nm to about 8 nm.

Also, for dispersion stability of the quantum dots, the solvent-free curable composition according to an embodiment may further include a dispersing agent. The dispersing agent helps with the uniform dispersibility of light conversion materials such as quantum dots in the solvent-free curable composition and may include a non-ionic, anionic, or cationic dispersing agent. For example, the dispersing agent may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine and/or the like, and the dispersing agent may be utilized alone or in a mixture of two or more. The dispersing agent may be utilized in an amount of about 0.1 wt % to about 100 wt %, for example, about 10 wt % to about 20 wt %, based on a (e.g., total) solid content of the light conversion material such as quantum dots.

The quantum dots surface-modified with Chemical Formula 1 or Chemical Formula 2 may be included in an amount of about 1 wt % to about 60 wt %, for example, about 3 wt % to about 50 wt %, based on a total amount of the solvent-free curable composition. When the surface-modified quantum dots are included within these ranges, a light conversion rate may be improved, and pattern characteristics and development characteristics are not interfered (e.g., are not reduced), so that it may have suitable (e.g., excellent) processability.

Polymerizable Monomer Having Carbon-Carbon Double Bond at the Terminal End

The monomer having the carbon-carbon double bond at the terminal end may be (e.g., should be) included in an amount of about 40 wt % to about 99 wt %, for example, about 50 wt % to about 97 wt %, based on a total amount of the solvent-free curable composition. When the monomer having the carbon-carbon double bond at the terminal end is included within these ranges, a solvent-free curable composition having a viscosity that enables (e.g., that is suitable for) ink-jetting may be prepared and the quantum dots in the prepared solvent-free curable composition may have improved dispersibility, thereby improving optical characteristics.

For example, the monomer having the carbon-carbon double bond at the terminal end may have a molecular weight of about 220 g/mol to about 1,000 g/mol. When the monomer having the carbon-carbon double bond at the terminal end has a molecular weight within this range, it may be suitable (e.g., advantageous) for ink-jetting because it does not increase a viscosity of the composition and does not hinder the optical characteristics of the quantum dots.

For example, the monomer having the carbon-carbon double bond at the terminal end may be represented by Chemical Formula 3, but the present disclosure is not necessarily limited thereto.

Chemical Formula 3

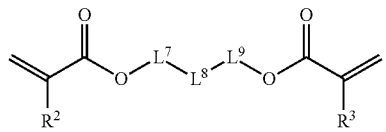

In Chemical Formula 3, $R^2$ and $R^3$ are each independently a hydrogen atom or a substituted or unsubstituted C1 to C10 alkyl group, $L^7$ and $L^9$ are each independently a substituted or unsubstituted C1 to C10 alkylene group, and $L^8$ is a substituted or unsubstituted C1 to C10 alkylene group or an ether group (*—O—*).

For example, the monomer having the carbon-carbon double bond at the terminal end may be represented by Chemical Formula 3-1 or 3-2, but the present disclosure is not necessarily limited thereto.

Chemical Formula 3-1

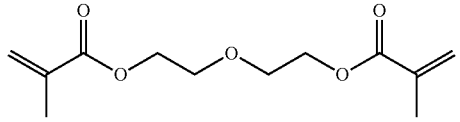

Chemical Formula 3-2

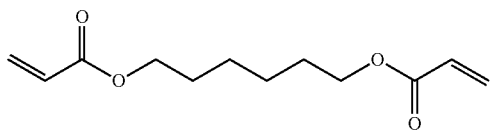

For example, the monomer having the carbon-carbon double bond at the terminal end may further include ethylene glycoldiacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolac epoxyacrylate, ethylene glycoldimethacrylate, triethylene glycoldimethacrylate, propylene glycoldimethacrylate, 1,4-butanedioldimethacrylate, 1,6-hexanedioldimethacrylate, or a combination thereof in addition to the aforementioned compound of Chemical Formula 3-1 or Chemical Formula 3-2.

In addition, together with the monomer having the carbon-carbon double bond at the terminal end, a suitable (e.g., generally-utilized) monomer of a related art thermosetting or photocurable composition may be further included. For example, the monomer may further include an oxetane-based compound such as bis[1-ethyl (3-oxetanyl)]methyl ether, and/or the like.

Polymerization Initiator

A solvent-free curable composition according to an embodiment may further include a polymerization initiator, for example, a photopolymerization initiator, a thermal polymerization initiator, or a combination thereof.

The photopolymerization initiator is a suitable (e.g., generally-utilized) initiator for a photosensitive resin composition, for example, an acetophenone-based compound, a benzophenone-based compound, a thioxanthone-based compound, a benzoin-based compound, a triazine-based compound, an oxime-based compound, an aminoketone-based compound, and/or the like, but the present disclosure is not necessarily limited thereto.

Examples of the acetophenone-based compound may be 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and/or the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and/or the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and/or the like.

Examples of the benzoin-based compound may be benzoin, benzoin methyl ether, benzoin ethyl ether, benzoin isopropyl ether, benzoin isobutyl ether, benzyldimethylketal, and/or the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloro methyl)-s-triazine, bis(trichloromethyl)-6-styryl-s-triazine, 2-(naphthol-yl)-4,6-bis(trichloromethyl)-s-triazine, 2-(4-methoxynaphthol-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and/or the like.

Examples of the oxime-based compound may be O-acyloxime-based compound, 2-(O-benzoyloxime)-1-[4-(phenylthio)phenyl]-1,2-octandione, 1-(0-acetyloxime)-1-[9-ethyl-6-(2-methylbenzoyl)-9H-carbazol-3-yl]ethanone, 0-ethoxycarbonyl-α-oxyamino-1-phenylpropan-1-one, and/or the like. Non-limiting examples of the O-acyloxime-based compound may be 1,2-octandione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and/or the like.

Examples of the aminoketone-based compound may be 2-benzyl-2-dimethylamino-1-(4-morpholinophenyl)-butanone-1, and/or the like.

The photopolymerization initiator may further include a carbazole-based compound, a diketone-based compound, a sulfonium borate-based compound, a diazo-based compound, an imidazole-based compound, a biimidazole-based compound, and/or the like, besides the compounds described above.

The photopolymerization initiator may be utilized with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and/or the like.

Examples of the thermal polymerization initiator may be peroxide, such as benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, 2,2-azobis(isobutyronitrile), t-butyl perbenzoate, and/or the like, azo polymerization initiators, for example 2,2'-azobis-2-methylpropinonitrile, and/or the like, but embodiments of the present disclosure are not necessarily limited thereto and any suitable thermal polymerization initiator (e.g., of which is well known in the related art) may be utilized.

The polymerization initiator may be included in an amount of about 0.1 wt % to about 5 wt %, for example, about 1 wt % to about 4 wt %, based on a total amount of the solvent-free curable composition. When the polymerization initiator is included in these ranges, it is possible to obtain suitable (e.g., excellent) reliability due to sufficient curing during exposure or thermal curing and to reduce or prevent deterioration of transmittance due to non-reaction initiators, thereby reducing or preventing deterioration of optical characteristics of the quantum dots.

Light Diffusing Agent (or Light Diffusing Agent Dispersion)

The solvent-free curable composition according to an embodiment may further include a light diffusing agent.

For example, the light diffusing agent may include barium sulfate ($BaSO_4$), calcium carbonate ($CaCO_3$), titanium dioxide ($TiO_2$), zirconia ($ZrO_2$), or a combination thereof.

The light diffusing agent may reflect unabsorbed light in the aforementioned quantum dots and allows the quantum dots to absorb the reflected light again. That is, the light diffusing agent may increase an amount of light absorbed by the quantum dots and increase light conversion efficiency of the curable composition.

The light diffusing agent may have an average particle diameter (D50) of about 150 nm to about 250 nm, and for example, about 180 nm to about 230 nm. When the average particle diameter of the light diffusing agent is within these ranges, it may have a better light diffusing effect and may increase light conversion efficiency.

The light diffusing agent may be included in an amount of about 1 wt % to about 20 wt %, for example, about 5 wt % to about 10 wt %, based on a total amount of the solvent-free curable composition. When the light diffusing agent is included in an amount of less than about 1 wt % based on a total amount of the solvent-free curable composition, it is difficult to expect a light conversion efficiency improvement effect due to the usage of the light diffusing agent, while when it is included in an amount of greater than about 20 wt %, there is a possibility that the quantum dots may be precipitated (e.g., out of the solvent-free curable composition).

Other Additives

For stability and dispersion improvement of the quantum dots, the solvent-free curable composition according to an embodiment may further include a polymerization inhibitor.

The polymerization inhibitor may include a hydroquinone-based compound, a catechol-based compound, or a combination thereof, but the present disclosure is not necessarily limited thereto. When the solvent-free curable composition according to an embodiment further includes the hydroquinone-based compound, the catechol-based compound, or the combination thereof, room temperature crosslinking during exposure after coating the solvent-free curable composition may be prevented or inhibited.

For example, the hydroquinone-based compound, the catechol-based compound, or the combination thereof may be hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O')aluminum, or a combination thereof, but embodiments of the present disclosure are not necessarily limited thereto.

The hydroquinone-based compound, the catechol-based compound, or the combination thereof may be utilized in a form of dispersion. The polymerization inhibitor in a form of dispersion may be included in an amount of 0.001 wt % to 3 wt %, for example, 0.1 wt % to 2 wt %, based on a total amount of the solvent-free curable composition. When the polymerization inhibitor is included in these ranges, passage of time at room temperature may be solved and concurrently or simultaneously sensitivity deterioration and surface delamination phenomenon may be reduced or prevented. That is, when the polymerization inhibitor is included in these ranges, the room temperature stability of the non-solvent curable composition may be improved, and reduction in curing sensitivity and delamination of the coating layer may both be reduced or prevented.

In addition, the solvent-free curable composition according to an embodiment may further include malonic acid; 3-amino-1,2-propanediol; a silane-based coupling agent; a leveling agent; a fluorine-based surfactant; or a combination thereof in order to improve heat resistance and reliability.

For example, the solvent-free curable composition according to an embodiment may further include a silane-based coupling agent having a reactive substituent such as a vinyl group, a carboxyl group, a methacryloxy group, an isocyanate group, an epoxy group, and/or the like in order to improve close contacting (e.g., adhesion) properties with a substrate.

Examples of the silane-based coupling agent may be trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexyl)ethyltrimethoxysilane, and/or the like, and these compounds may be utilized alone or in a mixture of two or more.

The silane-based coupling agent may be utilized in an amount of about 0.01 parts by weight to about 10 parts by weight based on 100 parts by weight of the solvent-free curable composition. When the silane-based coupling agent is included within this range, close contacting (e.g., adhesion) properties, storage capability, and/or the like are improved.

In addition, the solvent-free curable composition may further include a surfactant, for example, a fluorine-based surfactant, as needed in order to improve coating properties and inhibit generation of spots, that is, to improve leveling performance.

The fluorine-based surfactant may have a low weight average molecular weight of about 4,000 g/mol to about 10,000 g/mol, and for example, about 6,000 g/mol to about 10,000 g/mol. In addition, the fluorine-based surfactant may have a surface tension of about 18 mN/m to about 23 mN/m (measured in a 0.1% polyethylene glycol monomethylether acetate (PGMEA) solution). When the fluorine-based surfactant has a weight average molecular weight and a surface tension within these ranges, leveling performance may be further improved, and suitable (e.g., excellent) characteristics may be provided when coated utilizing high speed slit coating because less film defects may be generated by reducing or preventing a spot generation during the high speed coating and suppressing a vapor generation.

Examples of the fluorine-based surfactant may be, BM-1000®, and BM-1100® (BM Chemie Inc.); MEGAFACE F 142D®, F 172®, F 173®, and F 183® Dainippon Ink Kagaku Kogyo Co., Ltd.); FULORAD FC-135®, FULORAD FC-170C®, FULORAD FC-430®, and FULORAD FC-431 ® (Sumitomo 3M Co., Ltd.); SURFLON 5-112®, SURFLON S-113®, SURFLON S-131®, SURFLON S-141®, and SURFLON 5-145® (ASAHI Glass Co., Ltd.); and SH-28PA®, SH-190®, SH-193®, SZ-6032®, and SF-8428®, and the like (Toray Silicone Co., Ltd.); F-482, F-484, F-478, F-554 and the like of DIC Co., Ltd.

In addition, the solvent-free curable composition according to an embodiment may include a silicone-based surfactant in addition to the fluorine-based surfactant. Specific examples of the silicone-based surfactant may be TSF400, TSF401, TSF410, TSF4440, and the like of Toshiba silicone Co., Ltd., but the present disclosure is not limited thereto.

The surfactant may be included in an amount of about 0.01 parts by weight to about 5 parts by weight, for example, about 0.1 parts by weight to about 2 parts, by weight based on 100 parts by weight of the solvent-free curable composition. When the surfactant is included within these ranges, less foreign materials are produced (or included) in a sprayed (e.g., spray coated) composition.

In addition, the solvent-free curable composition according to an embodiment may further include other additives such as an antioxidant, a stabilizer, and/or the like in a set or predetermined amount, unless desired properties are deteriorated (when these additives are included).

In one embodiment, the curable composition may provide a solvent-based curable composition including quantum dots surface-modified by Chemical Formula 1 or Chemical Formula 2, a binder resin, and a solvent, in addition to the aforementioned solvent-free curable composition. Herein, the surface-modified quantum dots may be included in an amount of about 1 wt % to about 40 wt % based on a total amount of the solvent-based curable composition. When the surface-modified quantum dots are included in the amount range based on the total amount of the solvent-based curable composition, it may be desirable in terms of processability.

Specific examples of the acryl-based binder resin may be polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzylmethacrylate/styrene/2-hydroxyethylmethacrylate copolymer, and/or the like, but embodiments of the present disclosure are not limited thereto, and the acryl-based binder resin may be utilized alone or as a mixture of two or more.

A weight average molecular weight of the acryl-based binder resin may be about 5,000 g/mol to about 15,000 g/mol. When the acryl-based binder resin has a weight average molecular weight within this range, close contacting (e.g., adhesion) properties to a substrate, physical and chemical properties are improved, and a viscosity is appropriate.

The cardo-based resin may include a repeating unit represented by Chemical Formula 4.

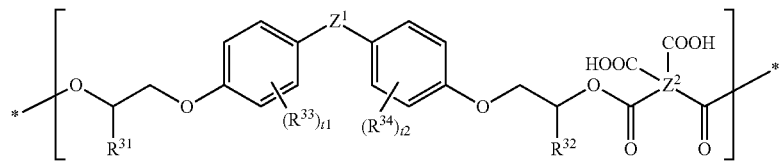

Chemical Formula 4

Hereinafter, each component constituting the solvent-based curable composition is described in more detail.

Binder Resin

The binder resin may include an acryl-based resin, a cardo-based resin, an epoxy resin, or a combination thereof.

The acryl-based resin may be a copolymer of a first ethylenic unsaturated monomer and a second ethylenic unsaturated monomer that are copolymerizable with each other, and may be a resin including at least one acryl-based repeating unit.

The first ethylenic unsaturated monomer may be an ethylenic unsaturated monomer including at least one carboxyl group, and examples of the monomer may include acrylic acid, methacrylic acid, maleic acid, itaconic acid, fumaric acid, or a combination thereof.

The first ethylenic unsaturated monomer may be included in an amount of about 5 wt % to about 50 wt %, for example, about 10 wt % to about 40 wt %, based on a total amount of the acryl-based binder resin.

The second ethylenic unsaturated monomer may be an aromatic vinyl compound (such as styrene, α-methylstyrene, vinyl toluene, vinylbenzylmethylether and/or the like); an unsaturated carboxylate ester compound (such as methyl (meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and/or the like); an unsaturated amino alkyl carboxylate ester compound (such as 2-aminoethyl (meth)acrylate, 2-dimethylaminoethyl(meth)acrylate, and/or the like); a carboxylic acid vinyl ester compound (such as vinyl acetate, vinyl benzoate, and/or the like); an unsaturated glycidyl carboxylate ester compound (such as glycidyl (meth)acrylate, and/or the like); a vinyl cyanide compound (such as (meth)acrylonitrile and/or the like); an unsaturated amide compound (such as (meth)acrylamide, and/or the like); and/or the like, and may be utilized alone or as a mixture of two or more.

In Chemical Formula 4, $R^{31}$ and $R^{32}$ are each independently a hydrogen atom or a substituted or unsubstituted (meth)acryloyloxy alkyl group, $R^{33}$ and $R^{34}$ are each independently a hydrogen atom, a halogen atom, or a substituted or unsubstituted C1 to C20 alkyl group, and $Z^1$ is a single bond, O, CO, $SO_2$, $CR^{35}R^{36}$, $SiR^{37}R^{38}$ (wherein, $R^{35}$ to $R^{38}$ are each independently a hydrogen atom or a substituted or unsubstituted C1 to C20 alkyl group), or one of linking groups represented by Chemical Formula 4-1 to Chemical Formula 4-11,

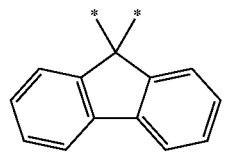

Chemical Formula 4-1

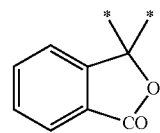

Chemical Formula 4-2

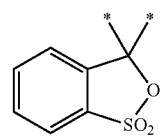

Chemical Formula 4-3

Chemical Formula 4-4

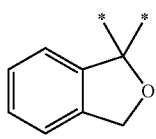

Chemical Formula 4-5

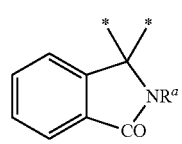

wherein, in Chemical Formula 4-5,
$R^a$ is a hydrogen atom, an ethyl group, $C_2H_4Cl$, $C_2H_4OH$, $CH_2CH=CH_2$, or a phenyl group.

Chemical Formula 4-6

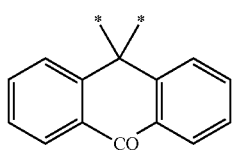

Chemical Formula 4-7

Chemical Formula 4-8

Chemical Formula 4-9

Chemical Formula 4-10

Chemical Formula 4-11

$Z^2$ is an acid anhydride residual group, and
t1 and t2 are each independently an integer from 0 to 4.

A weight average molecular weight of the cardo-based binder resin may be about 500 g/mol to about 50,000 g/mol, for example, about 1,000 g/mol to about 30,000 g/mol. When the weight average molecular weight of the cardo-based binder resin is within these ranges, a satisfactory pattern may be formed without a residue during a production of a cured layer and without losing a film thickness during development of the solvent-based curable composition.

The cardo-based binder resin may include a functional group represented by Chemical Formula 5 at least one terminal end of the two (e.g., both) terminal ends.

Chemical Formula 5

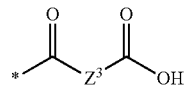

In Chemical Formula 5,
$Z^3$ is represented by one of Chemical Formula 5-1 to Chemical Formula 5-7.

Chemical Formula 5-1

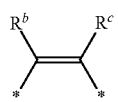

In Chemical Formula 5-1, $R^b$ and $R^c$ are each independently a hydrogen atom, a substituted or unsubstituted C1 to C20 alkyl group, an ester group, or an ether group.

Chemical Formula 5-2

Chemical Formula 5-3

Chemical Formula 5-4

Chemical Formula 5-5

In Chemical Formula 5-5, Rd is O, S, NH, a substituted or unsubstituted C1 to C20 alkylene group, a C1 to C20 alkylamine group, or a C2 to C20 alkenylamine group.

Chemical Formula 5-6

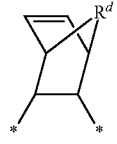

Chemical Formula 5-7

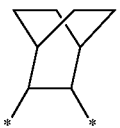

The cardo-based resin may be, for example, prepared by mixing at least two selected from a fluorene-containing compound (such as 9,9-bis(4-oxiranylmethoxyphenyl)fluorene); an anhydride compound (such as benzenetetracarboxylic acid dianhydride, naphthalenetetracarboxylic acid dianhydride, biphenyltetracarboxylic acid dianhydride, benzophenonetetracarboxylic acid dianhydride, pyromellitic dianhydride, cyclobutanetetracarboxylic acid dianhydride, perylenetetracarboxylic acid dianhydride, tetrahydrofurantetracarboxylic acid dianhydride, and/or tetrahydrophthalic anhydride); a glycol compound (such as ethylene glycol, propylene glycol, and/or polyethylene glycol); an alcohol compound (such as methanol, ethanol, propanol, n-butanol, cyclohexanol, and/or benzylalcohol); a solvent-based compound (such as propylene glycol methylethylacetate, and/or N-methylpyrrolidone); a phosphorus compound (such as triphenylphosphine); and an amine or ammonium salt compound (such as tetramethylammonium chloride, tetraethylammonium bromide, benzyldiethylamine, triethylamine, tributylamine, and/or benzyltriethylammonium chloride).

When the binder resin is a cardo-based resin, the solvent-based curable composition including the same (i.e., the binder resin), for example (e.g., particularly) the photosensitive resin composition may have (e.g., has) suitable (e.g., excellent) developability and sensitivity during photo-curing and thus, may have fine pattern-forming capability.

An acid value of the acryl-based resin may be about 80 mgKOH/g to about 130 mgKOH/g. When the acryl-based resin has an acid value within this range, suitable (e.g., excellent) resolution of a pixel may be obtained.

The epoxy resin may be a thermally polymerizable monomer or oligomer, and may include a compound having a carbon-carbon unsaturated bond and a carbon-carbon cyclic bond.

The epoxy resin may further include a bisphenol A epoxy resin, a bisphenol F epoxy resin, a phenol novolac epoxy resin, a cyclic aliphatic epoxy resin, and/or an aliphatic polyglycidyl ether, but the present disclosure is not necessarily limited thereto.

Suitable commercially available product of the compound (e.g., epoxy resin), may be a bisphenyl epoxy resin such as YX4000, YX4000H, YL6121H, YL6640, or YL6677 of Yuka Shell Epoxy Co., Ltd.; a cresol novolac epoxy resin such as EOCN-102, EOCN-1035, EOCN-1045, EOCN-1020, EOCN-1025, and EOCN-1027 of Nippon Kayaku Co. Ltd. and EPIKOTE 180S75, and the like of Yuka Shell Epoxy Co., Ltd.; a bisphenol A epoxy resin such as EPIKOTE 1001, 1002, 1003, 1004, 1007, 1009, 1010, and 828 of Yuka Shell Epoxy Co., Ltd.; a bisphenol F epoxy resin such as EPIKOTE 807 and 834 of Yuka Shell Epoxy Co., Ltd.; a phenol novolac epoxy resin such as EPIKOTE 152, 154, or 157H65 of Yuka Shell Epoxy Co. and EPPN 201, 202 of Nippon Kayaku Co. Ltd.; a cyclic aliphatic epoxy resin such as CY175, CY177, and CY179 of CIBA-GEIGY A.G Corp., ERL-4234, ERL-4299, ERL-4221 and ERL-4206 of U.C.C., Showdyne 509 of Showa Denko K.K., Araldite CY-182, CY-192 and CY-184 of CIBA-GEIGY A.G Corp., EPICLON 200 and 400 of Dainippon Ink & Chemicals Inc., EPIKOTE 871 and 872, and EP1032H60 of Yuka Shell Epoxy Co., Ltd., ED-5661 and ED-5662 of Celanese Coating Corporation; an aliphatic polyglycidylether such as EPIKOTE 190P and 191P of Yuka Shell Epoxy Co., Ltd., EPOLITE 100MF of Kyoeisha Yushi Kagaku Kogyo Co., Ltd., EPIOL TMP of Nihon Yushi K. K., and/or the like.

The binder resin may be included in an amount of about 1 wt % to about 30 wt % based on a total amount of the solvent-based curable composition.

Solvent

The solvent may include, for example, alcohols such as methanol, ethanol, and/or the like; glycol ethers such as ethylene glycol methylether, ethylene glycol ethylether, propylene glycol methylether, and/or the like; cellosolve acetates such as methyl cellosolve acetate, ethyl cellosolve acetate, diethyl cellosolve acetate, and/or the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and/or the like; propylene glycol alkylether acetates such as propylene glycol monomethylether acetate, propylene glycol propylether acetate, and/or the like; ketones such as methylethylketone, cyclohexanone, 4-hydroxy-4-methyl-2-pentanone, methyl-n-propylketone, methyl-n-butylketone, methyl-n-amylketone, 2-heptanone, and/or the like; saturated aliphatic monocarboxylic acid alkyl esters such as ethyl acetate, n-butyl acetate, isobutyl acetate, and/or the like; lactate esters such as methyl lactate, ethyl lactate, and/or the like; hydroxy acetic acid alkyl esters such as methyl hydroxyacetate, ethyl hydroxyacetate, butyl hydroxyacetate, and/or the like; acetic acid alkoxyalkyl esters such as methoxymethyl acetate, methoxyethyl acetate, methoxybutyl acetate, ethoxymethyl acetate, ethoxyethyl acetate, and/or the like; 3-hydroxypropionic acid alkyl esters such as methyl 3-hydroxypropionate, ethyl 3-hydroxypropionate, and/or the like; 3-alkoxypropionic acid alkyl esters such as methyl 3-methoxypropionate, ethyl 3-m ethoxypropionate, ethyl 3-ethoxypropionate, methyl 3-ethoxypropionate, and/or the like; 2-hydroxypropionic acid alkyl ester such as methyl 2-hydroxypropionate, ethyl 2-hydroxypropionate, propyl 2-hydroxypropionate, and/or the like; 2-alkoxypropionic acid alkyl esters such as methyl 2-methoxypropionate, ethyl 2-methoxypropionate, ethyl 2-ethoxypropionate, methyl 2-ethoxypropionate, and/or the like; 2-hydroxy-2-methylpropionic acid alkyl esters such as methyl 2-hydroxy-2-methylpropionate, ethyl 2-hydroxy-2-methylpropionate, and/or the like; 2-alkoxy-2-methylpropionic acid alkyl esters such as methyl 2-methoxy-2-methylpropionate, ethyl 2-ethoxy-2-methylpropionate, and/or the like; esters such as 2-hydroxyethyl propionate, 2-hydroxy-2-methylethyl propionate, hydroxyethyl acetate, methyl 2-hydroxy-3-m ethylbutanoate, and/or the like; and/or ketonate esters such as ethyl pyruvate, and/or the like, and in addition, may be N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, and/or the like, but the present disclosure is not limited thereto.

For example, the solvent may be desirably glycol ethers such as ethylene glycol monoethylether, ethylene diglycolmethylethylether, and/or the like; ethylene glycol alkylether acetates such as ethyl cellosolve acetate, and/or the like; esters such as 2-hydroxy ethyl propionate, and/or the like;

carbitols such as diethylene glycol monomethylether, and/or the like; propylene glycol alkylether acetates such as propylene glycol monomethylether acetate, propylene glycol propylether acetate, and/or the like; alcohols such as ethanol, and/or the like, or a combination thereof.

For example, the solvent may be a polar solvent including propylene glycol monomethylether acetate, dipropylene glycol methylether acetate, ethanol, ethylene glycoldimethylether, ethylenediglycolmethylethylether, diethylene glycoldimethylether, 2-butoxyethanol, N-methylpyrrolidine, N-ethylpyrrolidine, propylene carbonate, γ-butyrolactone, or a combination thereof.

The solvent may be included in a balance amount (e.g., the solvent may make up for the balance of the solvent-based curable composition), for example, about 30 wt % to about 80 wt %, or about 35 wt % to about 70 wt % based on a total amount of the solvent-based curable composition. When the solvent is within these ranges, the solvent-based curable composition has appropriate viscosity and thus may have a suitable (e.g., excellent) coating property when coated in a large area through spin-coating and/or slit-coating.

In one embodiment, the solvent-based curable composition may further include at least one of a polymerizable monomer having a carbon-carbon double bond at the terminal end, a polymerization initiator, a light diffusing agent, and other additives. The specific composition or amount of the polymerizable monomer is as described above.

For example, the solvent-based curable composition may be a photosensitive resin composition. In this case, the solvent-based curable composition may include a photopolymerization initiator as the polymerization initiator.

According to other embodiments, a cured layer may be produced utilizing the aforementioned solvent-free curable composition and/or solvent-based curable composition, a color filter may include the cured layer, and a display device may include the color filter.

One of the methods of producing the cured layer may include coating the aforementioned solvent-free curable composition and/or solvent-based curable composition on a substrate utilizing an ink-jet spraying method to form a pattern (S1); and curing the pattern (S2).

(S1) Formation of Pattern

The solvent-free curable composition may desirably be coated to be about 0.5 μm to about 20 μm in thickness on a substrate in an ink-jet spraying method. The ink-jet spraying method may form a pattern by spraying a single color per each nozzle and thus repeating the spraying as many times as the number of colors needed, but the pattern may be formed by concurrently or simultaneously spraying the number of colors needed through each ink-jet nozzle in order to reduce the number of processes. That is, the pattern may be formed by concurrently spraying the number of colors needed through a plurality of nozzles (e.g., each spraying one of the colors).

(S2) Curing

The obtained pattern is cured to obtain a pixel. Herein, the curing method may be thermal curing and/or photocuring process. The thermal curing process may be performed at greater than or equal to about 100° C., desirably, in a range of about 100° C. to about 300° C., and more desirably, in a range of about 160° C. to about 250° C. The photocuring process may include irradiating an actinic ray such as a UV ray of about 190 nm to about 450 nm, for example, about 200 nm to about 500 nm. The irradiating is performed by utilizing a light source such as a mercury lamp (with a low pressure, a high pressure, or an ultrahigh pressure), a metal halide lamp, an argon gas laser, and/or the like. An X ray, an electron beam, and/or the like may also be utilized as needed.

The other method of producing the cured layer may include producing a cured layer utilizing the aforementioned solvent-free curable composition or solvent-based curable composition by a lithographic method as follows.

(1) Coating and Film Formation

The aforementioned curable composition is coated to have a desired thickness, for example, a thickness from about 2 μm to about 10 μm, on a substrate (which has undergone a set or predetermined pretreatment), utilizing a spin coating method, a slit coating method, a roll coating method, a screen-printing method, an applicator method, and/or the like. Then, the coated substrate is heated at a temperature of about 70° C. to about 90° C. for about 1 minute to about 10 minutes to remove a solvent and to form a film.

(2) Exposure

The resultant film is irradiated by an actinic ray such as a UV ray of about 190 nm to about 450 nm, for example, about 200 nm to about 500 nm, through a mask with a set or predetermined shape to form a desired pattern. The irradiation is performed by utilizing a light source such as a mercury lamp (with a low pressure, a high pressure, or an ultrahigh pressure), a metal halide lamp, an argon gas laser, and/or the like. An X ray, an electron beam, and/or the like may also be utilized as needed.

Exposure process utilizes, for example, a light dose of 500 mJ/cm$^2$ or less (with a 365 nm sensor) when a high pressure mercury lamp is utilized. However, the light dose may vary depending on kinds (e.g., types) of each component of the curable composition, their combination ratio, and/or a dry film thickness.

(3) Development

After the exposure process, an alkali aqueous solution is utilized to develop the exposed film by dissolving and removing an unnecessary part except the exposed part, thereby forming an image pattern. In other words, when the alkali developing solution is utilized for the development, a non-exposed region is dissolved, and an image color filter pattern is formed.

(4) Post-Treatment

The developed image pattern may be heated again or irradiated by an actinic ray and/or the like for curing, in order to accomplish suitable (e.g., excellent) quality in terms of heat resistance, light resistance, close contacting (e.g., adhesion) properties, crack-resistance, chemical resistance, high strength, storage stability, and/or the like.

Hereinafter, the subject matter of the present disclosure is illustrated in more detail with reference to examples. These examples, however, are not in any sense to be interpreted as limiting the scope of the disclosure.

Ligand Synthesis

Synthesis Example 1

191 g of p-toluenesulfonic chloride and 150 mL of THF were slowly added to a mixed solution of 270 g of polyoxyethylene phenyl ether (PH-4, Hannong Chemicals Inc.), 44 g of NaOH, 500 mL of tetrahydrofuran (THF), and 100 mL of distilled water at 0° C. 30 minutes later after the addition, the obtained mixture was stirred at room temperature (23° C.) for 12 hours. When a reaction was complete, a product therefrom was extracted, neutralized, and concentrated and then, sufficiently dried in a vacuum oven. The dried product was put in a flask and dissolved in ethanol under a nitrogen atmosphere. Then, 4 equivalents of thiourea was added thereto and then, stirred at 100° C. for 12 hours. Subsequently, a diluted NaOH solution was additionally added thereto and then, further stirred for 5 hours. When a reaction was complete, the resultant was washed and extracted with water and a hydrochloric acid diluted solution, neutralized, and then, sufficiently dried in a vacuum oven. 68 g of zinc chloride was added to a product therefrom and then, extracted at 80° C. for 12 hours to obtain 300 g of a final product represented by Chemical Formula 1-1.

Chemical Formula 1-1

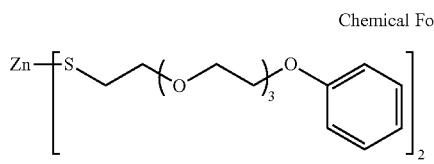

Synthesis Example 2

191 g of p-toluenesulfonic chloride and 150 mL of THF were slowly added to a mixed solution of 400 g of polyoxyethylene monomethyl ether (MPEG-400, Hannong Chemicals Inc.), 44 g of NaOH, 500 mL of THF, and 100 mL of distilled water at 0° C. 30 minutes later after the addition, the obtained mixture was stirred at room temperature (23° C.) for 12 hours. When a reaction was complete, the resultant was extracted, neutralized, and concentrated and then, sufficiently dried in a vacuum oven. The dried product was put in a flask and then, dissolved in ethanol under a nitrogen atmosphere. Then, 4 equivalents of thiourea was added thereto and then, stirred at 100° C. for 12 hours. A NaOH diluted solution was additionally added thereto and further stirred for 5 hours. When a reaction was complete, the resultant was washed and extracted with water and a hydrochloric acid diluted solution and neutralized and then, sufficiently dried in a vacuum oven. 68 g of zinc chloride was added to the obtained product and then, reacted at 80° C. for 12 hours to obtain 420 g of a final product represented by Chemical Formula 1-2.

Chemical Formula 1-2

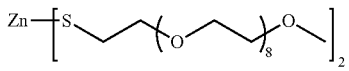

Synthesis Example 3

270 g of polyoxyethylene phenyl ether (PH-4, Hannong Chemicals Inc.) and 100 g of succinic anhydride were put together and then, heated up to 100° C. and reacted for 12 hours. The resultant was cooled down to room temperature (23° C.), and 68 g of zinc chloride was added thereto and then, reacted at 80° C. for 12 hours to obtain 435 g of a final product represented by Chemical Formula 1-3.

Chemical Formula 1-3

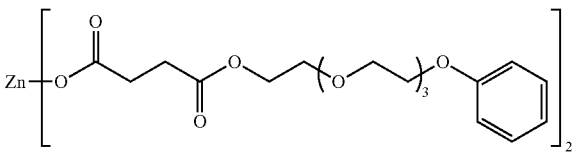

Synthesis Example 4

191 g of p-toluenesulfonic chloride and 150 mL of THF were slowly added to a mixed solution of 270 g of polyoxyethylene phenyl ether (PH-4, Hannong Chemicals Inc.), 44 g of NaOH, 500 mL of THF, and 100 mL of distilled water at 0° C. 30 minutes later after the addition, the obtained mixture was stirred at room temperature (23° C.) for 12 hours. When a reaction was complete, the resultant was extracted, neutralized, and concentrated and then, sufficiently dried in a vacuum oven. The obtained product was put in a flask and dissolved in ethanol under a nitrogen atmosphere. After adding 4 equivalents of thiourea thereto, the mixture was stirred at 100° C. for 12 hours. A NaOH diluted solution was added thereto and then, further stirred for 5 hours. When a reaction was complete, the resultant was washed and extracted with water and a hydrochloric acid diluted solution, neutralized, and then, sufficiently dried in a vacuum oven. 286 g of the obtained product, 104 g of zinc acrylate, 10 g of triethylamine, and 300 mL of THF were added thereto and then, reacted at 50° C. for 12 hours, while air-purged, diluted with an excessive amount of dichloromethane, and neutralized with a 5% HCl aqueous solution to take an organic layer alone, and the organic layer was concentrated under a reduced pressure to obtain 350 g of a final product represented by Chemical Formula 1-4.

Chemical Formula 1-4

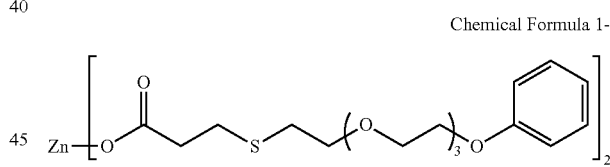

Synthesis Example 5

191 g of p-toluenesulfonic chloride and 150 mL of a diluted THF solution were slowly added to 600 g of polyoxyethylene monoallyl ether, 44 g of NaOH, 500 mL of THF, and 100 mL of distilled water at 0° C. 30 minutes later after the addition, the obtained mixture was stirred at room temperature for 12 hours. When a reaction was complete, the resultant was purified through extraction, neutralization, and concentration and then, sufficiently dried in a vacuum oven. The obtained product was put in a flask and dissolved in ethanol under a nitrogen atmosphere. Then, 4 equivalents of thiourea was added thereto and then, stirred at 100° C. for 12 hours. A NaOH diluted solution was added thereto and then, further stirred for 5 hours. When a reaction was complete, the resultant was washed several times and extracted with distilled water and a hydrochloric acid diluted solution and neutralized and then, sufficiently dried in a vacuum oven. 68 g of zinc chloride was added to the obtained product and then, reacted at 80° C. for 12 hours to obtain 420 g of a final product represented by Chemical Formula 1-5.

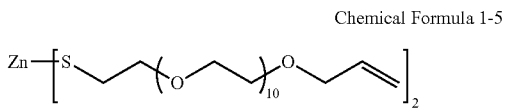

Chemical Formula 1-5

Synthesis Example 6

600 g of polyoxyethylene monoallyl ether, 98 g of cyclobutane-1,2,3,4-tetracarboxylic dianhydride, 500 g of toluene, and 60 g of triethylene amine were put together and reacted at 100° C. for 24 hours. When a reaction was complete, the resultant was washed several times and extracted with distilled water and a hydrochloric acid diluted solution, neutralized, and then, sufficiently dried in a vacuum oven. 136 g of zinc chloride was added to the obtained product and then, reacted at 80° C. for 12 hours to obtain 801 g of a final product represented by Chemical Formula 2-1.

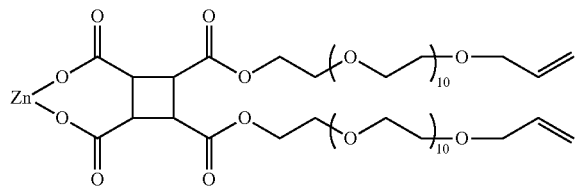

Chemical Formula 2-1

Comparative Synthesis Example 1

In a 2 neck round-bottomed flask, 10 g of 2-mercapto-1-ethanol, 13.3 g of 2-2-(2-methoxyethoxy)ethoxy acetic acid, and 2.1 g of p-toluenesulfonic acid monohydrate were added and dissolved in 300 mL of cyclohexane. A dean stark was fastened with an injection hole, and a condenser was connected thereto. After refluxing the solution for 8 hours, the reaction was completed (e.g., indicated through a final amount of water gathered in the dean stark). The reactant was transported to a separating funnel, extracted, neutralized to remove the solvent, and dried in a vacuum oven to obtain a final product represented by Chemical Formula C-1.

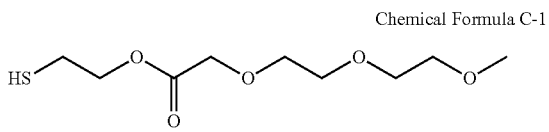

Chemical Formula C-1

Dispersion of Quantum Dot Surface-Modified with Ligand

Preparation Example 1

After putting a magnetic bar in a 3-neck round-bottomed flask, a quantum dot-CHA (cyclohexyl acetate) solution (solid content: 26 wt % to 27 wt %) was measured and added thereto. The ligand represented by Chemical Formula 1-1 was added thereto.

The resultant was well mixed for 1 minute and then, stirred at 80° C. under a nitrogen atmosphere. When the reaction was complete, the resultant was cooled down to room temperature, and the quantum dot reaction solution was added to cyclohexane to get precipitates. The precipitated quantum dot powders were separated from the cyclohexane through centrifugation. A clear solution was poured out and discarded, and then, the precipitates were sufficiently dried in a vacuum oven for one day to obtain surface-modified quantum dots.

The surface-modified quantum dots were stirred (e.g., mixed by stirring) with a monomer represented by Chemical Formula 3-2 (1,6-hexanediol diacrylate, Miwon Commercial Co., Ltd) for 12 hours to obtain surface-modified quantum dot dispersion.

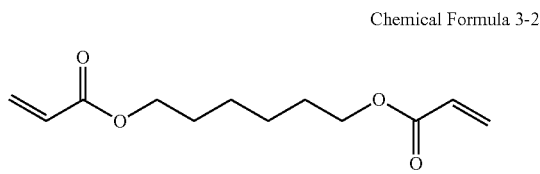 [SMILES: C=CC(=O)OCCCCCCOC(=O)C=C]

Chemical Formula 3-2

Preparation Example 2

Surface-modified quantum dot dispersion was obtained according to the same method as Preparation Example 1 except that the ligand represented by Chemical Formula 1-2 was utilized instead of the ligand represented by Chemical Formula 1-1.

Preparation Example 3

Surface-modified quantum dot dispersion was obtained according to the same method as Preparation Example 1 except that the ligand represented by Chemical Formula 1-3 was utilized instead of the ligand represented by Chemical Formula 1-1.

Preparation Example 4

Surface-modified quantum dot dispersion was obtained according to the same method as Preparation Example 1 except that the ligand represented by Chemical Formula 1-4 was utilized instead of the ligand represented by Chemical Formula 1-1.

Preparation Example 5

Surface-modified quantum dot dispersion was obtained according to the same method as Preparation Example 1 except that the ligand represented by Chemical Formula 1-5 was utilized instead of the ligand represented by Chemical Formula 1-1.

Preparation Example 6

Surface-modified quantum dot dispersion was obtained according to the same method as Preparation Example 1 except that the ligand represented by Chemical Formula 2-1 was utilized instead of the ligand represented by Chemical Formula 1-1.

Comparative Preparation Example 1

Surface-modified quantum dot dispersion was obtained according to the same method as Preparation Example 1 except that the ligand represented by Chemical Formula C-1 was utilized instead of the ligand represented by Chemical Formula 1-1.

Evaluation 1: Dispersibility

A particle size of each quantum dot dispersion according to Preparation Examples 1 to 6 and Comparative Preparation Example 1 was measured three times by utilizing a micro particle size analyzer to obtain an average particle size, and the results are shown in Table 1.

TABLE 1

| Particle size (nm) | Preparation Example 1 | Preparation Example 2 | Preparation Example 3 | Preparation Example 4 | Preparation Example 5 | Preparation Example 6 | Comparative Preparation Example 1 |
|---|---|---|---|---|---|---|---|
| D50 | 11.0 | 11.2 | 11.6 | 10.9 | 11.2 | 11.5 | 15.0 |

Referring to Table 1, each of the quantum dot dispersion according to Preparation Examples 1 to 6 exhibited a narrow particle size distribution (e.g., a smaller D50), which shows that the quantum dots were well dispersed in a high boiling-point and high surface-tension solvent (e.g., monomer), but the quantum dot dispersion according to Comparative Preparation Example 1 exhibited a wider particle size distribution, which shows that the quantum dots were not well dispersed in the high boiling-point and high surface-tension solvent (e.g., monomer).

Preparation of Solvent-Free Curable Composition

Example 1

The dispersion according to Preparation Example 1 was weighed and then, mixed and diluted with the monomer represented by Chemical Formula 3-2, and a polymerization inhibitor (methylhydroquinone, Tokyo Chemical Industry Co., Ltd.) was added thereto and then, stirred for 5 minutes. Subsequently, a photoinitiator (TPO-L; Polynetron) was added thereto, and a light diffusing agent ($TiO_2$ (a solid content: 50 wt %); Ditto Technology Co., Ltd.) was added thereto. The total (e.g., entire) dispersion was stirred for 1 hour to prepare a solvent-free curable composition. 40 wt % of the quantum dots, 48 wt % of the monomer represented by Chemical Formula 3-2, 1 wt % of the polymerization inhibitor, 3 wt % of the photoinitiator, and 8 wt % of the light diffusing agent were included based on a total amount of the solvent-free curable composition.

Example 2

A solvent-free curable composition was prepared according to the same method as Example 1 except that the dispersion obtained in Preparation Example 2 was utilized instead of the dispersion obtained in Preparation Example 1.

Example 3

A solvent-free curable composition was prepared according to the same method as Example 1 except that the dispersion obtained in Preparation Example 3 was utilized instead of the dispersion obtained in Preparation Example 1.

Example 4

A solvent-free curable composition was prepared according to the same method as Example 1 except that the dispersion obtained in Preparation Example 4 was utilized instead of the dispersion obtained in Preparation Example 1.

Example 5

A solvent-free curable composition was prepared according to the same method as Example 1 except that the dispersion obtained in Preparation Example 5 was utilized instead of the dispersion obtained in Preparation Example 1.

Example 6

A solvent-free curable composition was prepared according to the same method as Example 1 except that the dispersion obtained in Preparation Example 6 was utilized instead of the dispersion obtained in Preparation Example 1.

Comparative Example 1

A solvent-free curable composition was prepared according to the same method as Example 1 except that the dispersion obtained in Comparative Preparation Example 1 was utilized instead of the dispersion obtained in Preparation Example 1.

Evaluation 2: Evaluation of Optical Characteristics

Each solvent-free curable composition according to Example 1 to Example 6 and Comparative Example 1 was coated to be about 15 μm thick on yellow photoresists (YPR) with a spin coater (800 rpm, 5 seconds, Opticoat MS-A150, Mikasa Co., Ltd.) and exposed with 5000 mJ (83° C., 10 seconds) with a 395 nm UV exposer under a nitrogen atmosphere (to produce a corresponding sample). Subsequently, a 2 cm×2 cm single film specimen of each sample was loaded in an integrating sphere equipment (QE-2100, Otsuka Electronics, Co., Ltd.) to measure a light conversion rate (e.g., an initial light conversion rate), and the results are shown in Table 2. Then, the loaded single film specimens were dried at 180° C. in a drying furnace under a nitrogen atmosphere for 30 minutes, and then, light conversion rates of each of the specimens of the dried samples (i.e., after the exposure with the 395 nm UV exposer and after the drying at 180° C.) were measured. The light retention rate, i.e., a ratio of the light conversion rate of the dried sample versus the initial conversion rate, for each of the samples is then calculated, and the results are also shown in Table 2.

TABLE 2

| | Light conversion rate (%) | Light retention rate (%) | Maximum emission wavelength (nm) |
|---|---|---|---|
| Example 1 | 28.4 | 90 | 541 |
| Example 2 | 27.3 | 88 | 541 |
| Example 3 | 28.9 | 94 | 542 |
| Example 4 | 28.9 | 94 | 542 |
| Example 5 | 26.6 | 94 | 541 |
| Example 6 | 27.3 | 92 | 542 |
| Comparative Example 1 | 22.8 | 91 | 543 |

From Table 2, it can be seen that the solvent-free curable composition according to an embodiment exhibited improved optical properties.

Preparation of Solvent-based Curable Composition

Example 7

The following components were utilized in corresponding amounts to prepare a solvent-based curable composition (photosensitive resin composition).

Specifically, the photopolymerization initiator was dissolved in the solvent and then, sufficiently stirred at room temperature for 2 hours. Subsequently, the binder resin along with the quantum dot dispersion of Preparation Example 1, the dispersing agent (TEGO D685, Evonik Corp.), and the polymerizable monomer was added thereto and then, stirred again at room temperature for 2 hours. Then, the light diffusing agent and the fluorine-based surfactant were added thereto and then, stirred for 1 hour at room temperature, and the above product was filtered three times to remove impurities and thus prepare a solvent-based curable composition.

1) Quantum dot dispersion: Preparation Example 1
2) Binder resin: 25 wt % of cardo-based binder resin (TSR-TA01, TAKOMA)
3) Polymerizable monomer: 5.4 wt % of pentaerythritol-hexamethacrylate (DPHA, Nippon Kayaku)
4) Photopolymerization initiator: 0.7 wt % of diphenyl(2,4,6-trimethylbenzoyl)phosphine oxide (TPO, Sigma-Aldrich Corporation)
5) Solvent: 39 wt % of dimethyl adipate
6) Light diffusing agent: 15 wt % of titanium dioxide dispersion (a $TiO_2$ solid content: 20 wt %, an average particle diameter: 200 nm, Ditto Technology)
7) Other additives: 0.9 wt % of fluorine-based surfactant (F-554, DIC Co., Ltd.)

Example 8

A solvent-based curable composition was obtained according to the same method as Example 7 except that the quantum dot dispersion of Preparation Example 2 was utilized instead of the quantum dot dispersion of Preparation Example 1.

Example 9

A solvent-based curable composition was obtained according to the same method as Example 7 except that the quantum dot dispersion of Preparation Example 3 was utilized instead of the quantum dot dispersion of Preparation Example 1.

Example 10

A solvent-based curable composition was obtained according to the same method as Example 7 except that the quantum dot dispersion of Preparation Example 4 was utilized instead of the quantum dot dispersion of Preparation Example 1.

Example 11

A solvent-based curable composition was obtained according to the same method as Example 7 except that the quantum dot dispersion of Preparation Example 5 was utilized instead of the quantum dot dispersion of Preparation Example 1.

Example 12

A solvent-based curable composition was obtained according to the same method as Example 7 except that the quantum dot dispersion of Preparation Example 6 was utilized instead of the quantum dot dispersion of Preparation Example 1.

Comparative Example 2

A solvent-based curable composition was obtained according to the same method as Example 7 except that the quantum dot dispersion of Comparative Preparation Example 1 was utilized instead of the quantum dot dispersion of Preparation Example 1.

Evaluation 3: Light Conversion Rate and Light Retention Rate of Quantum Dots

The solvent-based curable compositions according to Example 7 to Example 12 and Comparative Example 2 were respectively coated to be 6 μm thick on a single-surface of a glass substrate with a spin coater (150 rpm, Opticoat MS-A150, Mikasa Co., Ltd.) and then, dried on a hot-plate at 80° C. for 1 minute to obtain respective films. Each of the films was irradiated with UV with a power of 100 mJ/cm². Then, a light conversion rate for each of the films was measured with an exposer (ghi broadband, Ushio Inc.) before (initial light conversion rate) and after performing post-baking (POB) once and the results are shown in Table 3. The POB was conducted in a convection clean oven (Jongro) at 180° C. for 30 minutes.

TABLE 3

| | | | | | | | (unit: %) |
| --- | --- | --- | --- | --- | --- | --- | --- |
| | Example 7 | Example 8 | Example 9 | Example 10 | Example 11 | Example 12 | Comparative Example 2 |
| Initial light conversion rate | 25.9 | 24.7 | 26.3 | 26.5 | 23.9 | 24.6 | 22 |
| Light conversion rate after performing POB once | 25.4 | 24.3 | 25.9 | 26.0 | 23.6 | 24.3 | 20.0 |

As shown in Table 3, the solvent-based curable composition prepared by utilizing surface-modified quantum dots according to an embodiment exhibited small reduction (e.g., deterioration) of a light conversion rate (e.g., in comparison with the solvent-free curable compositions according to Example 1 to Example 6) due to a color filter manufacturing process but exhibited a high light retention rate (i.e., the ratio between the light conversion rate after performing POB once and the initial light conversion rate).

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. As used herein, the term "substantially," "about," and similar terms are used as terms of approximation and not as terms of degree, and are intended to account for the inherent deviations in measured or calculated values that would be recognized by those of ordinary skill in the art. Moreover, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims, and equivalents thereof. Therefore, the aforementioned embodiments should be understood to be exemplary but not limiting the subject matter of the present disclosure in any way.

What is claimed is:

1. A quantum dot surface-modified with a compound represented by Chemical Formula 1 or Chemical Formula 2:

Chemical Formula 1

$$M\text{---}(L^1\text{---}L)_n$$

Chemical Formula 2

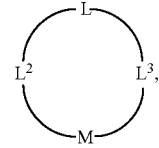

wherein, in Chemical Formula 1 and Chemical Formula 2,
M is a metal atom,
L is a monovalent or divalent functional group comprising a substituted or unsubstituted C1 to C20 oxyalkylene group,
$L^1$ is an oxygen atom, a sulfur atom, *—C(=O)O—*, or *—OC(=O)—*,
$L^2$ and $L^3$ are each independently *—C(=O)O—* or *—OC(=O)—*, and
n is an integer of 2 to 4,
wherein the compound represented by Chemical Formula 1 contains only one metal atom.

2. The quantum dot of claim 1, wherein
the monovalent functional group further comprises a substituted or unsubstituted C1 to C20 alkyl group, and
the divalent functional group further comprises a substituted or unsubstituted C3 to C20 cycloalkylene group.

3. The quantum dot of claim 1, wherein the monovalent or divalent functional group each independently comprises a substituted or unsubstituted C1 to C20 alkyl group, a substituted or unsubstituted C1 to C20 alkoxy group, a substituted or unsubstituted epoxy group, a substituted or unsubstituted C6 to C20 aryl group, or a substituted or unsubstituted vinyl group, at a terminal end thereof.

4. The quantum dot of claim 1, wherein M is Zn, Mg, Al, or In.

5. The quantum dot of claim 1, wherein the compound represented by Chemical Formula 1 is represented by Chemical Formula 1A:

Chemical Formula 1A

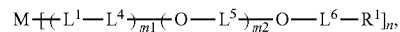

and
wherein, in Chemical Formula 1A,
$R^1$ is a substituted or unsubstituted C1 to C20 alkyl group, a substituted or unsubstituted epoxy group, a substituted or unsubstituted C6 to C20 aryl group, or a substituted or unsubstituted vinyl group,
$L^1$ is an oxygen atom, a sulfur atom, *—C(=O)O—*, or *—OC(=O)—*,
$L^4$ and $L^5$ are each independently a substituted or unsubstituted C1 to C20 alkylene group,
$L^6$ is a single bond or a substituted or unsubstituted C1 to C20 alkylene group,
m1 and m2 are each independently an integer of 1 to 20, and
n is an integer of 2 to 4.

6. A quantum dot surface-modified with a compound represented by Chemical Formula 1 or Chemical Formula 2:

$$M \!-\!\!\left(L^1 \!-\! L\right)_n \quad \text{Chemical Formula 1}$$

Chemical Formula 2

(ring structure with L at top, $L^2$ and $L^3$ on sides, M at bottom)

wherein, in Chemical Formula 1 and Chemical Formula 2,
M is a metal atom,
L is a monovalent or divalent functional group comprising a substituted or unsubstituted C1 to C20 oxyalkylene group,
$L^1$ is an oxygen atom, a sulfur atom, *—C(=O)O—*, or *—OC(=O)—*,
$L^2$ and $L^3$ are each independently *—C(=O)O—* or *—OC(=O)—*, and
n is an integer of 2 to 4,
wherein the compound represented by Chemical Formula 2 is represented by Chemical Formula 2A:

Chemical Formula 2A $$M{\overset{L^2}{\underset{L^3}{\Big\langle}}}L^7{\Big(}{\Big(}L^1\!-\!L^4{\Big)}_{m1}\!{\big(}O\!-\!L^5{\big)}_{m2}O\!-\!L^6\!-\!R^1\Big)_2}$$

and
wherein, in Chemical Formula 2A,
$R^1$ is a substituted or unsubstituted C1 to C20 alkyl group, a substituted or unsubstituted epoxy group, a substituted or unsubstituted C6 to C20 aryl group, or a substituted or unsubstituted vinyl group,
$L^1$ is an oxygen atom, a sulfur atom, *—C(=O)O—*, or *—OC(=O)—*,
$L^2$ and $L^3$ are each independently *—C(=O)O—* or *—OC(=O)—*,
$L^4$ and $L^5$ are each independently a substituted or unsubstituted C1 to C20 alkylene group,
$L^6$ is a single bond or a substituted or unsubstituted C1 to C20 alkylene group,
$L^7$ is a substituted or unsubstituted C3 to C20 cycloalkylene group, and
m1 and m2 are each independently an integer of 1 to 20.

7. A quantum dot surface-modified with a compound represented by Chemical Formula 1 or Chemical Formula 2:

$$M\!-\!\!\left(L^1\!-\!L\right)_n \quad \text{Chemical Formula 1}$$

Chemical Formula 2

(ring structure with L at top, $L^2$ and $L^3$ on sides, M at bottom)

wherein, in Chemical Formula 1 and Chemical Formula 2,
M is a metal atom,
L is a monovalent or divalent functional group comprising a substituted or unsubstituted C1 to C20 oxyalkylene group,
$L^1$ is an oxygen atom, a sulfur atom, *—C(=O)O—*, or *—OC(=O)—*,
$L^2$ and $L^3$ are each independently *—C(=O)O—* or *—OC(=O)—*, and
n is an integer of 2 to 4,
wherein the compound represented by Chemical Formula 1 is represented by one of Chemical Formula 1-1 to Chemical Formula 1-6:

Chemical Formula 1-1

$$Zn{\Big(}S\!-\!CH_2CH_2{\big(}O{\big)}_{m2}\!O\!-\!C_6H_5{\Big)}_2$$

Chemical Formula 1-2

$$Zn{\Big(}S\!-\!CH_2CH_2{\big(}O{\big)}_{m2}\!O\!-\!CH_3{\Big)}_2$$

Chemical Formula 1-3

$$Zn{\Big(}O\!-\!C(=O)CH_2CH_2C(=O)O\!-\!CH_2CH_2{\big(}O{\big)}_{m2}\!O\!-\!C_6H_5{\Big)}_2$$

Chemical Formula 1-4

$$Zn{\Big(}O\!-\!C(=O)CH_2CH_2\!-\!S\!-\!CH_2CH_2{\big(}O{\big)}_{m2}\!O\!-\!C_6H_5{\Big)}_2$$

Chemical Formula 1-5

$$Zn{\Big(}S\!-\!CH_2CH_2{\big(}O{\big)}_{m2}\!O\!-\!CH_2\!-\!CH\!=\!CH_2{\Big)}_2$$

Chemical Formula 1-6

$$Zn{\Big(}S\!-\!CH_2CH_2{\big(}O{\big)}_{m2}\!O\!-\!CH_2\!-\!\text{(epoxide)}{\Big)}_2,$$

and
wherein, in Chemical Formula 1-1 to Chemical Formula 1-6,
m2 is an integer of 1 to 20.

8. The quantum dot of claim 1, wherein the compound represented by Chemical Formula 2 is represented by Chemical Formula 2-1:

Chemical Formula 2-1

(Zn coordinated to a cyclobutane-1,2,3,4-tetracarboxylic acid derivative with two ester arms each bearing $-(OCH_2CH_2)_{10}-O-CH_2CH=CH_2$ allyl end groups)

and
wherein, in Chemical Formula 2-1,
m2 is an integer of 1 to 20.

9. The quantum dot of claim 1, wherein the quantum dot has a maximum fluorescence emission wavelength at about 500 nm to about 680 nm.

10. A solvent-free curable composition comprising:
the quantum dot of claim 1; and
a polymerizable monomer having a carbon-carbon double bond at a terminal end thereof.

11. The solvent-free curable composition of claim 10, wherein the polymerizable monomer has a molecular weight of about 220 g/mol to about 1,000 g/mol.

12. The solvent-free curable composition of claim 10, wherein the polymerizable monomer is represented by Chemical Formula 3:

Chemical Formula 3

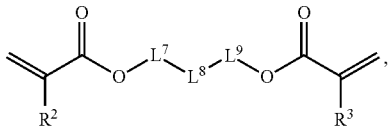

and
wherein, in Chemical Formula 3,
$R^2$ and $R^3$ are each independently a hydrogen atom or a substituted or unsubstituted C1 to C10 alkyl group,
$L^7$ and $L^9$ are each independently a substituted or unsubstituted C1 to C10 alkylene group, and
$L^8$ is a substituted or unsubstituted C1 to C10 alkylene group or an ether group (*—O—*).

13. The solvent-free curable composition of claim 10, wherein
the solvent-free curable composition comprises:
about 1 wt % to about 60 wt % of the quantum dot, and
about 40 wt % to about 99 wt % of the polymerizable monomer.

14. The solvent-free curable composition of claim 10, wherein the solvent-free curable composition further comprises a polymerization initiator, a light diffusing agent, or a combination thereof.

15. A solvent-based curable composition comprising:
the quantum dot of claim 1;
a binder resin; and
a solvent.

16. The solvent-based curable composition of claim 15, wherein the solvent-based curable composition comprises:
about 1 wt % to about 40 wt % of the quantum dot;
about 1 wt % to about 30 wt % of the binder resin; and
a balance being an amount of the solvent.

17. The solvent-based curable composition of claim 15, wherein the solvent-based curable composition further comprises a polymerizable monomer, a polymerization initiator, a light diffusing agent, or a combination thereof.

18. A cured layer produced by curing the solvent-free curable composition of claim 10.

19. A cured layer produced by curing the solvent-based curable composition of claim 15.

20. A color filter comprising the cured layer of claim 18.

21. A color filter comprising the cured layer of claim 19.

* * * * *

UNITED STATES PATENT AND TRADEMARK OFFICE
CERTIFICATE OF CORRECTION

PATENT NO. : 11,912,911 B2
APPLICATION NO. : 17/028858
DATED : February 27, 2024
INVENTOR(S) : Yonghee Kang et al.

Page 1 of 1

It is certified that error appears in the above-identified patent and that said Letters Patent is hereby corrected as shown below:

In the Claims

In Column 36, Lines 59-65, in Claim 8, Chemical Formula 2-1, delete "

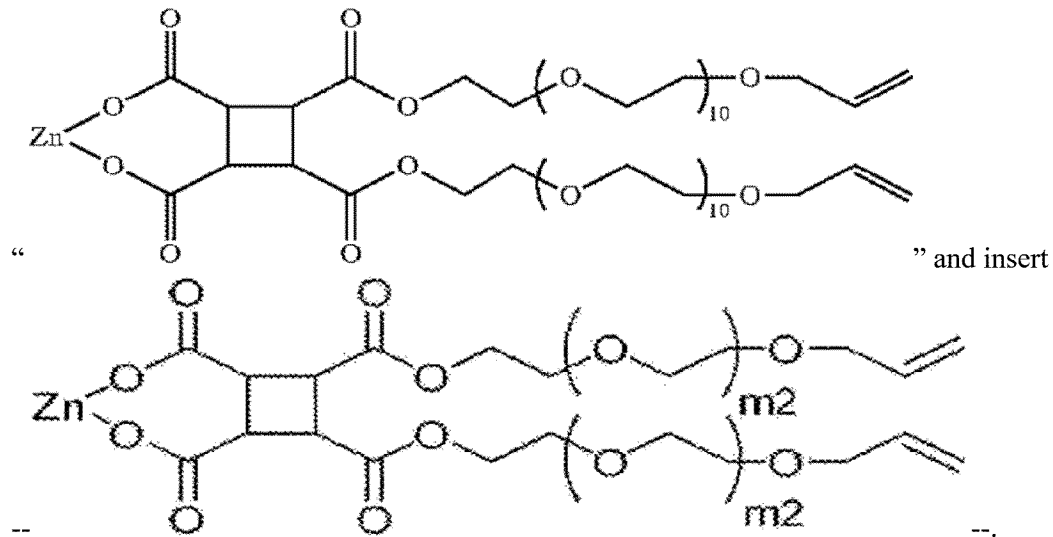

" and insert --

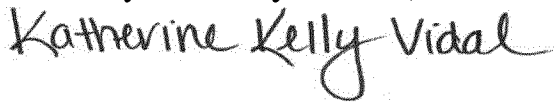

--.

Signed and Sealed this
Twenty-fifth Day of June, 2024

Katherine Kelly Vidal
*Director of the United States Patent and Trademark Office*